(12) United States Patent
Kim et al.

(10) Patent No.: US 9,184,422 B2
(45) Date of Patent: Nov. 10, 2015

(54) RECHARGEABLE BATTERY

(75) Inventors: Yong-Sam Kim, Suwon-si (KR); Dae-Won Han, Suwon-si (KR)

(73) Assignee: SAMSUNG SDI CO., LTD., Suwon-si, Gyeonggi-do (KR)

( * ) Notice: Subject to any disclaimer, the term of this patent is extended or adjusted under 35 U.S.C. 154(b) by 846 days.

(21) Appl. No.: 12/629,194

(22) Filed: Dec. 2, 2009

(65) Prior Publication Data
US 2010/0151317 A1    Jun. 17, 2010

(30) Foreign Application Priority Data
Dec. 12, 2008   (KR) .................... 10-2008-0126775

(51) Int. Cl.
| H01M 2/02 | (2006.01) |
| H01M 2/04 | (2006.01) |
| H01M 10/04 | (2006.01) |
| H01M 10/052 | (2010.01) |
| H01M 10/0587 | (2010.01) |

(52) U.S. Cl.
CPC .......... *H01M 2/0413* (2013.01); *H01M 2/0482* (2013.01); *H01M 10/0431* (2013.01); *H01M 10/052* (2013.01); *H01M 10/0587* (2013.01); *Y02T 10/7011* (2013.01)

(58) Field of Classification Search
CPC .................................. H01M 2/02; H01M 2/08
USPC ..................... 429/163, 66, 185, 164
See application file for complete search history.

(56) References Cited

U.S. PATENT DOCUMENTS

2007/0141449 A1* 6/2007 Kim ............................... 429/66

FOREIGN PATENT DOCUMENTS

| JP | 2007-172911 | 7/2007 |
| KR | 10-2006-0010482 | 2/2006 |
| KR | 10-0717802 | 5/2007 |

* cited by examiner

*Primary Examiner* — Ula C Ruddock
*Assistant Examiner* — Daniel Gatewood
(74) *Attorney, Agent, or Firm* — Knobbe Martens Olson & Bear LLP

(57) ABSTRACT

A rechargeable battery including: an electrode assembly that includes a positive electrode, a negative electrode, and a separator interposed therebetween; a case to house the electrode assembly; a cap assembly that is coupled to an opening of the case and electrically connected with the electrode assembly; and an insulating member that is installed between the case and the electrode assembly. The insulating member includes a body disposed on the electrode assembly and a rib that extends from the body and contacts the case.

20 Claims, 6 Drawing Sheets

RECHARGEABLE BATTERY

CROSS-REFERENCE TO RELATED APPLICATION

This application claims the benefit of Korean Patent Application No. 10-2008-0126775 filed on Dec. 12, 2008, in the Korean Intellectual Property Office, the disclosure of which is incorporated herein by reference.

BACKGROUND

1. Field

The present teachings relate to a rechargeable battery.

2. Description of the Related Art

Rechargeable batteries can be repeatedly charged and discharged, unlike primary batteries. A low-capacity rechargeable battery constituted by one cell is used for a small portable electronic device, i.e., a mobile phone, a laptop computer, or a camcorder. A large-capacity rechargeable battery, constituted by a plurality of cells connected to each other in a pack, is widely used for a power supply of a hybrid electric vehicle.

Rechargeable batteries are manufactured in various shapes. Exemplary shapes may include a cylindrical shape, a prismatic shape, etc. For high power applications, rechargeable batteries can be connected in series and incorporated in a large-capacity rechargeable battery module.

Rechargeable batteries include: an electrode assembly, in which a positive electrode and a negative electrode are disposed on opposing sides of by a separator; a case to house the electrode; and a cap assembly that seals the case. Positive and negative uncoated regions, where active materials are not coated, are formed on the positive and negative electrodes, at opposing ends of the electrode assembly.

A negative electrode current collecting plate is attached to the negative electrode uncoated region, and a positive electrode current collecting plate is attached to the positive electrode uncoated region. The negative electrode current collecting plate is electrically connected with the case, and the positive electrode current collecting plate is electrically connected with the cap assembly, to induce current to the outside. Accordingly, the case serves as a negative terminal, and a cap-up installed in the cap assembly serves as a positive terminal.

When external forces, such as shocks or vibrations, are transmitted to a rechargeable battery, the electrical contacts of the current collecting plates may be damaged. When an electrical contact in a welded part is damaged, resistance increases, such that the output of the rechargeable battery may decrease, and when the welded part is disconnected, the current cannot be transmitted to the outside.

The above information disclosed in this Background section is only for enhancement of understanding of the background of the present teachings, and therefore, it may contain information that does not constitute prior art.

SUMMARY

The present teachings provide a rechargeable battery that has improved resistance to vibration and shock.

An exemplary embodiment of the present teachings provides a rechargeable battery that includes: an electrode assembly that includes a positive electrode, a negative electrode, and a separator interposed therebetween; a case to house the electrode assembly; a cap assembly that is coupled to an opening of the case and is electrically connected with the electrode assembly; and an insulating member that is installed between the case and the electrode assembly, and which includes a rib.

According to aspects of the present teachings, the rechargeable battery further includes a current collecting plate that is electrically connected with the positive electrode or the negative electrode, wherein the insulating member may be configured to surround the periphery of the current collecting plate. The insulating member may include a flange that is in close contact with a top surface of the current collecting plate, and a body from which the flange protrudes, is positioned between the case and the electrode assembly. The rib may protrude upward on the outer surface of the body. A longitudinal cross-section of the rib and the body may be Y-shaped.

According to aspects of the present teachings, the rib may extend from a lower end of the outer surface of the body. A longitudinal cross-section of the rib and the body may be V-shaped.

According to aspects of the present teachings, the rib may protrude on the outer surface of the body, in an arc shape. A sealed shock absorbing space may be formed between the rib and the body.

According to aspects of the present teachings, the insulating member may include a plurality of the ribs, which are spaced apart on the periphery of the body.

According to aspects of the present teachings, the rib may be formed from a curved part of the body.

As described above, according to various embodiments of the present teachings, a rib is formed on an insulating member, to thereby stably support a current collecting plate and a electrode assembly. As a result, an electrical contact between the current collecting plate and the electrode assembly, or an electrical contact between the current collecting plate and the cap assembly, are prevented from being damaged by external forces, to thereby improve the stability of a rechargeable battery.

According to aspects of the present teachings, the contact resistance between the current collecting plate and the electrode assembly, or between the current collecting plate and the cap assembly, is prevented from being increased, to thereby improve output.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
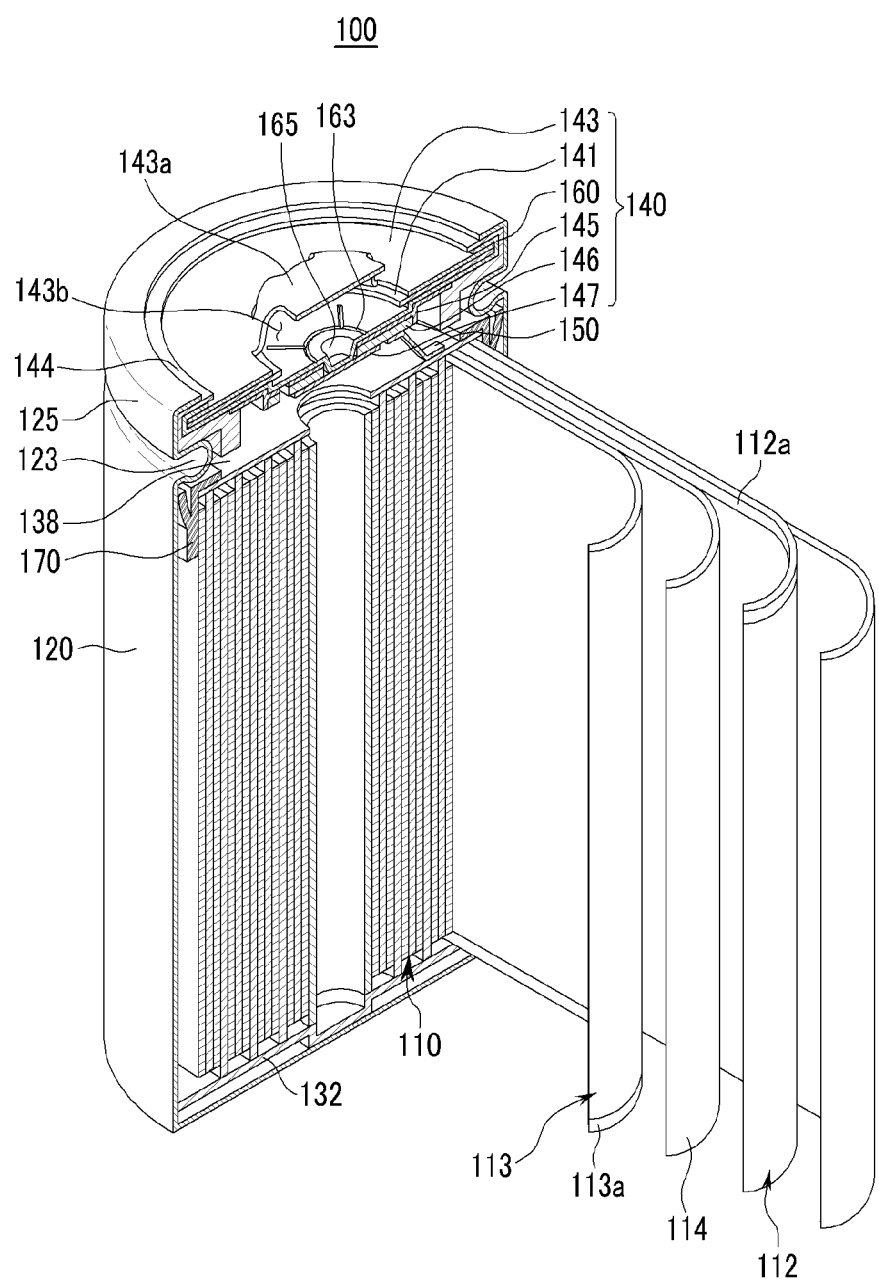
FIG. 1 is a cross-sectional perspective view of a rechargeable battery, according to a first exemplary embodiment of the present teachings.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

FIG. 1 is a cross-sectional perspective view of a rechargeable battery 100, according to a first exemplary embodiment of the present teachings. Referring to FIG. 1, the rechargeable battery 100 includes: an electrode assembly 110; a case 120 to house the electrode assembly 110 and an electrolytic solution; and a cap assembly 140 to seal an opening of the case 120, via a gasket 144. The electrode assembly 110 includes a positive electrode 112, a negative electrode 113, and a separator 114 interposed therebetween.

Herein, an upper end of the rechargeable battery 100 refers to the end where the cap assembly 140 is disposed, and a lower end refers to the opposing end of the rechargeable battery 100. In addition, when a first element is referred to as being above a second element, the first element is disposed closer to the upper end. Similarly, when a first element is referred to as being below a second element, the first element is disposed closer to the lower end.

The case 120 is generally made of a conductive metal, such as aluminum, an aluminum alloy, or nickel-plated steel. The case 120 has a cylindrical shape and defines an inner space where the electrode assembly 110 is positioned. The cap assembly 140 is fixed to the case 120, by crimping the case 120 thereon. The crimping forms a beading portion 123 that extends inside of the case 120, and a clamping portion 125 that is disposed above the beading portion 123.

Although the electrode assembly 110 is a cylindrical-type, in which the positive electrode 112, the separator 114, and the negative electrode 113 are stacked and wound in a spiral shape, the structure of the electrode assembly 110 is not limited thereto. For example, the electrode assembly 110 may have other structures, such as a prismatic shape, etc.

The positive electrode 112 includes a positive electrode uncoated region 112a where a positive active material is not applied, which is formed at an upper end of the rechargeable battery 100. The positive electrode uncoated region 112a is electrically connected to a positive electrode current collecting plate 138. Further, the negative electrode 113 includes a negative electrode uncoated region 113a where a negative active material is not applied, which is formed at an opposing lower end of the rechargeable battery 100. The negative electrode uncoated region 113a is electrically connected to a negative electrode current collecting plate 132.

The positive electrode current collecting plate 138 is shown to be installed at the upper end of the rechargeable battery 100, and the negative electrode current collecting plate 132 is installed at a lower end of the rechargeable battery 100, but the present teachings are not limited thereto. In particular, the positive electrode current collecting plate 138 may be installed at the lower end, and the negative electrode current collecting plate 132 may be installed at the upper end.

The negative electrode 113 has a structure in which the negative active material is applied to a current collector made of copper or aluminum. The positive electrode 112 has a structure in which a positive active material is applied to a current collector made of aluminum. The negative active material may include a carbon-based active material, and the positive active material may include the carbon-based active material, a manganese-based active material, or a ternary active material.

The cap assembly 140 includes a cap-up 143, and a vent plate 160. The cap-up includes a protruding outer terminal 143a and an exhaust hole 143b. The vent plate 160 is installed below the cap-up 143 and has a notch 163 that is broken at a predetermined pressure, to discharge gas. The vent plate 160 can be made of aluminum and serves to break an electrical connection between the electrode assembly 110 and the cap-up 143, when broken.

A positive temperature coefficient element 141 is installed between the cap-up 143 and the vent plate 142. The electrical resistance of the positive temperature coefficient element 141 increases to approximately infinity, as the temperature thereof increases. The positive temperature coefficient element 141 serves to interrupt current flow, when the temperature of the rechargeable battery 100 reaches a predetermined temperature. A convex portion 165 protrudes downward from the center of the vent plate 160, and a sub-plate 147 is welded to the bottom of the convex portion 165.

A cap-down 146 is installed between the vent plate 160 and the sub-plate 147. The cap-down 146 has a disc shape and includes a hole at the center thereof, to accommodate the convex portion 165.

An insulating plate 145 is installed between the cap-down 146 and the vent plate 160, to insulate the cap-down 146 and the vent plate 160 from each other. A hole in which the convex portion 165 fits is also formed on the insulating plate 145. Therefore, the convex portion 165 of the vent plate 160 can be easily bonded with the sub-plate 147, through the holes.

The sub-plate 147 is welded to each of the convex portion 165 and the cap-down 146. The cap-down 146 is electrically connected with the electrode assembly 110, through a lead member 150.

The current stored in the electrode assembly 110 is transmitted to the vent plate 160, via the lead member 150, the cap-down 146, and the sub-plate 147. The vent plate 160 transmits the current to the outer terminal 143a of the cap-up 143, due to being bonded with the cap-up 143. When the internal pressure of the rechargeable battery increases, the convex portion 165 is separated from the sub-plate 147, to interrupt current flow.

An insulating member 170, to insulate the case 120 and the positive current collecting plate 138 from each other, is installed on the positive electrode current collecting plate 138. The insulating member 170 is installed below the beading portion 123, around the periphery of the positive electrode current collecting plate 138.

In the exemplary embodiment, the insulating member 170 is installed on the positive electrode current collecting plate 138, but the present invention is not limited thereto. In particular, the insulating member 170 may be installed on the negative electrode current collecting plate 132, for example.

Figure 2:
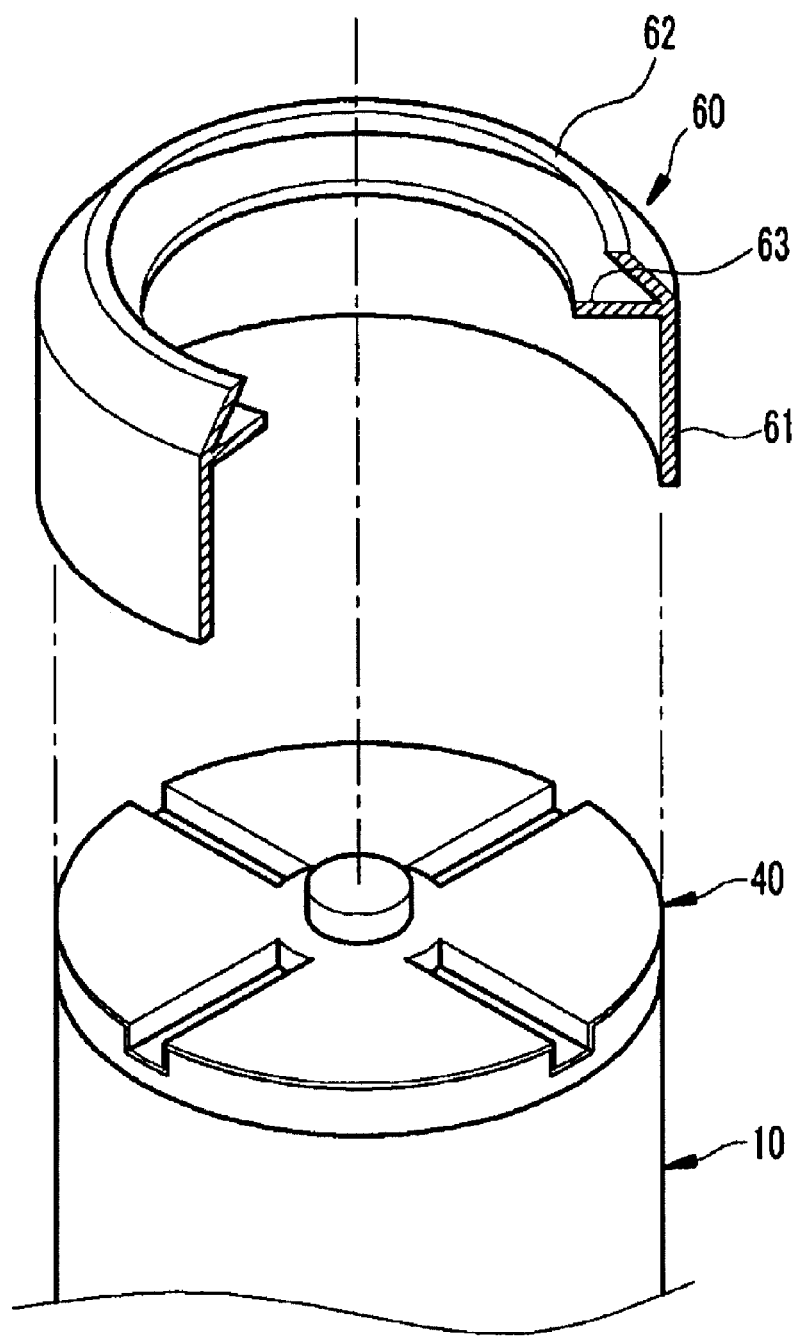
FIG. 2 is a cross-sectional perspective view of an insulating member, according to a first exemplary embodiment of the present teachings.

FIG. 2 is a cross-sectional perspective view of the insulating member 170. Referring to FIG. 2, the insulating member 170 includes a flange 172 that is in close contact with a top surface of the positive electrode current collecting plate 138, a body 171 that extends from the flange 172 toward to the electrode assembly 110, and an elastically deformable rib 175 that protrudes from the outside of the body 171.

The insulating member 170 is generally annular. The flange 172 is inwardly bent from the body 171, at a substantially right angle, and is disposed at an upper end of the body 171. The rib 175 extends from an outer surface of the body 171.

The rib 175 is disposed at an angle, with respect to the outer surface of the body 171, and protrudes upward. Longitudinal cross-sections of the rib 175 and the body 171 are substantially Y-shaped. Therefore, the free end of the rib 175 is located furthest from the body 171.

The insulating member 170 is generally made of a material having a high elasticity. For example, the insulating member 170 may be made of polypropylene, or the like.

Figure 3A:
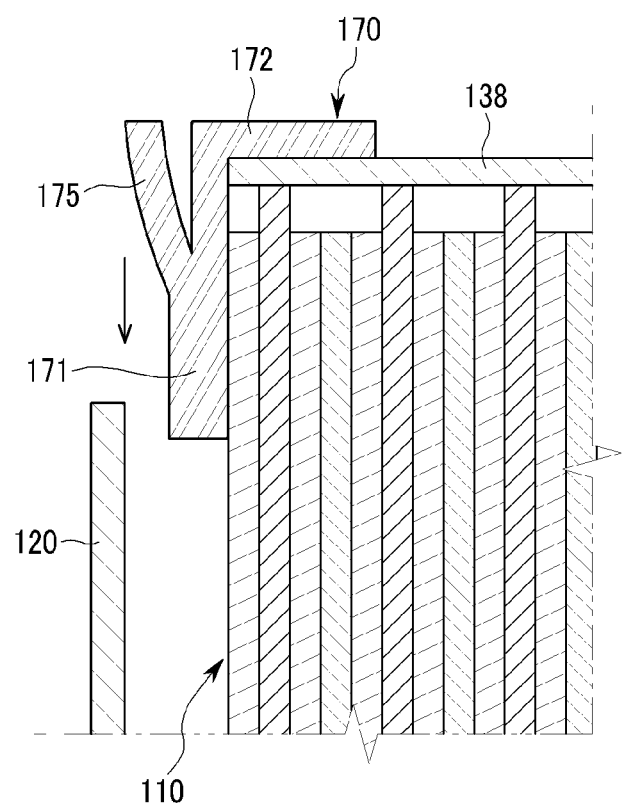
FIGS. 3A and 3B are diagrams illustrating a process in which the insulating member of FIG. 2 is elastically deformed while being inserted into a case.
Figure 3B:
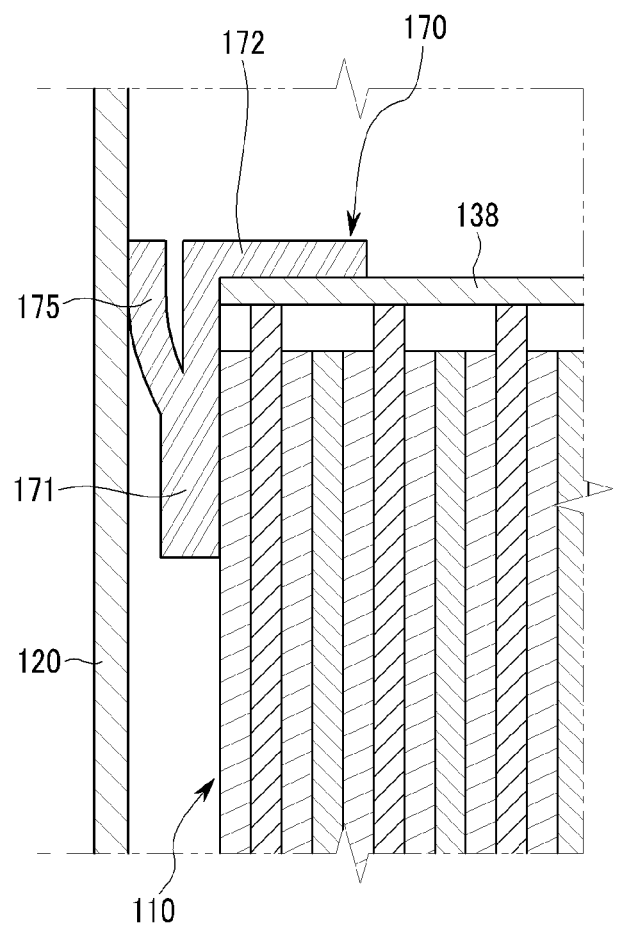

FIGS. 3A and 3B are diagrams illustrating a process by which the insulating member 170 is elastically deformed, while being inserted into the case 120. Referring to FIGS. 3A and 3B, the insulating member 170 is inserted into the case 120, in contact with the top surface of the positive electrode current collecting plate 138 and the outer surface of the electrode assembly 110. In this process, the rib 175 is bent toward the body 171, due to contact with the case 120, thereby decreasing the distance between the free end of the rib 175 and the body 171.

The rib 175 presses against the case 120, due to being deformed, and the body 171 presses the electrode assembly 110. As a result, the insulating member 170 protects the electrode assembly 110 and the positive electrode current collecting plate 138 from external forces applied to the case 120. Therefore, the insulting member 170 prevents external shocks and or vibrations from damaging the electrical connections between the electrode assembly 110 and the positive electrode current collecting plate 138, and between the positive electrode current collecting plate 138 and the cap assembly 140. This improves the reliability of the rechargeable battery 100.

Because the insulating member 170 is Y-shaped, the insulating member 170 can be easily inserted into the case 120. In addition, the rib 175 is easily deformed, such that it is possible to more stably support the current collecting plate 138 and the electrode assembly 110.

Figure 4:
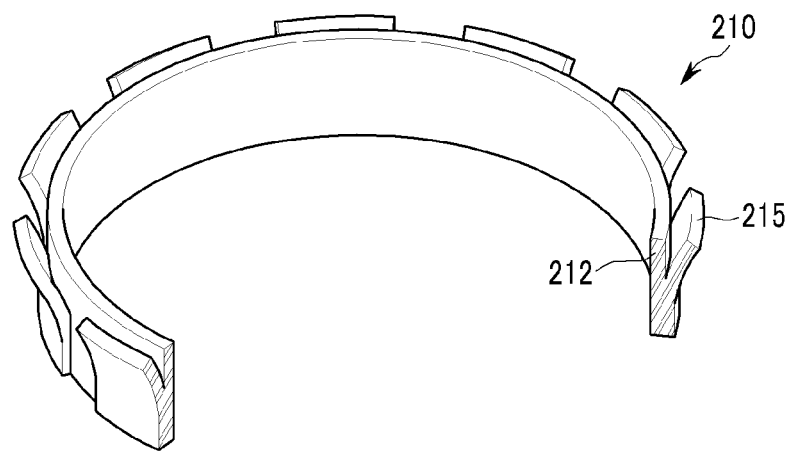
FIG. 4 is a cross-sectional perspective view of an insulating member, according to a second exemplary embodiment of the present teachings.

FIG. 4 is a cross-sectional perspective view of an insulating member 210 installed in a rechargeable battery, according to a second exemplary embodiment of the present invention. The rechargeable battery has the same structure as the rechargeable battery 100, except for a structure of an insulating member 210. Therefore, the same components will not be repetitively described.

Referring to FIG. 4, the insulating member 210 is generally annular and includes a body 212 and elastically deformable ribs 215 that protrude from the outer surface of the body 212. Each of the ribs 215 is inclined with respect to the outer surface of the body 212 and protrudes upward. Longitudinal cross-sections of the ribs 215 and the body 212 are substantially Y-shaped. Therefore, the free ends of the ribs 215 are disposed the furthest from the body 212.

The ribs 215 spaced apart from each other on the outer surface of the body 212. As such, the ribs 215 can be more easily deformed and separately provide support, such that it is possible to prevent a pressing force from being uneven.

The body 212 contacts the positive electrode current collecting plate 138 and/or the electrode assembly 110. The insulating member 210 does not have a flange to surround the periphery of the positive electrode current collecting plate 138, is separated from the positive electrode current collecting plate 138, and surrounds and supports only the electrode assembly 110. Multiple supporting members 212 may be installed around the electrode assembly 110. In this case, the electrode assembly 110 can be supported more stably.

Although the insulating member 210 is shown as being annular, the present teachings are not limited thereto. In particular, the insulating member 210 may be rectangular, so as to conform to the outer surface of an electrode assembly of a prismatic battery.

Figure 5:
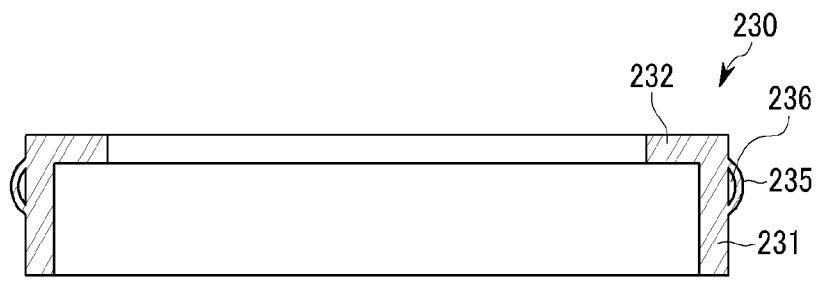
FIG. 5 is a longitudinal cross-sectional view of an insulating member, according to a third exemplary embodiment of the present teachings.

FIG. 5 is a longitudinal cross-sectional view of an insulating member 230 of a rechargeable battery, according to a third exemplary embodiment of the present invention. The rechargeable battery according to this exemplary embodiment has the same structure as the rechargeable battery 100, except for the structure of the insulating member 230. Therefore, the same components will not be repetitively described.

Referring to FIG. 5, the insulating member 230 includes: a flange 232 that contacts the positive electrode current collecting plate 138, a body 231 that contacts the outer surface of the electrode assembly 110; and an elastically deformable rib 235 extends from the body 231. The rib 235 has a substantially arc-shaped structure, so as to protrude from the outer surface of the body 231.

A sealed shock absorbing space 236 is formed between the rib 235 and the body 231. The shock absorbing space 236 is filled with a gas, such as air, or the like. The shock absorbing space 236 allows the rib 235 to be easily deformed by contact with the case 120, when the insulating member 230 is inserted into the case 120. Further, since the sealed shock absorbing space 236 is filled with gas, a uniform pressing force is applied between the rib 235 and the case 120, according to Pascal's law. As a result, the positive electrode current collecting plate 138 and the electrode assembly 110 can be stably supported. Further, since the rib 235 is supported by the shock absorbing space, the thickness of the rib 235 can be reduced.

Figure 6:
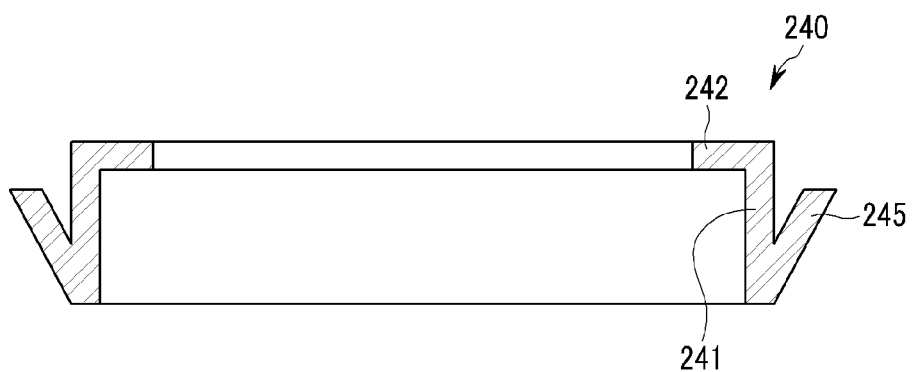
FIG. 6 is a longitudinal cross-sectional view of an insulating member, according to a fourth exemplary embodiment of the present teachings.

FIG. 6 is a longitudinal cross-sectional view of an insulating member 240 of a rechargeable battery, according to a fourth exemplary embodiment of the present invention. The rechargeable battery has the same structure as the rechargeable battery 100, except for a structure of an insulating member 240. Therefore, the same components will not be repetitively described.

Referring to FIG. 6, the insulating member 240 includes: a flange 242 that contacts the top surface of the current collecting plate 138; a body 241 extends downward from the flange 242, along the electrode assembly 110; and an elastically deformable rib 245 that protrudes outwardly from the body 241.

The rib 245 extends upward from the lower end of the body 241, is inclined with respect to the body 241, and extends upward. The distance between the rib 245 and the body 241 is greatest at a free end of the flange 242. Longitudinal cross-sections of the rib 245 and the body 241 are substantially V-shaped. As such, the insulating member 240 can be easily inserted into the case, and the rib 245 can be easily manufactured by folding a lower end of the body 241.

Figure 7:
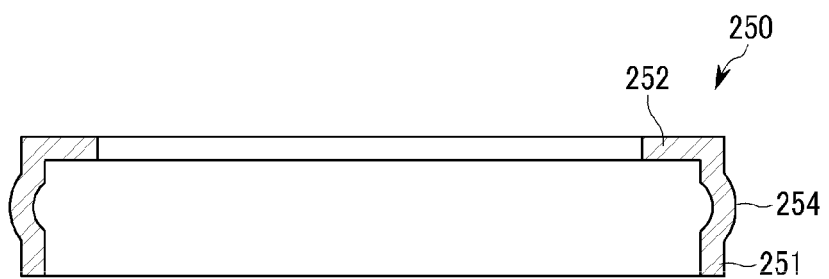
FIG. 7 is a longitudinal cross-sectional view of an insulating member, according to a fifth exemplary embodiment of the present teachings.

FIG. 7 is a longitudinal cross-sectional view of an insulating member 250 of a rechargeable battery, according to a fifth exemplary embodiment of the present teachings. The rechargeable battery has the same structure as the rechargeable battery 100, except for a structure of the insulating member 250. Therefore, the same components will not be repetitively described.

Referring to FIG. 7, the insulating member 250 includes: a flange 252 that is in close contact with a top surface of the positive electrode current collecting plate 138; a body 251 that protrudes downward from the flange 252, along the electrode assembly 110; and an elastically deformable rib 254 that protrudes outwardly from the body 251.

The rib 254 is formed from a curved portion of the body 251. The rib 254 can be thinner than other portions of the body 251, so as to be easily deformed.

The rib 254 is substantially arc-shaped. As such, the rib can be easily formed, and the current collecting plate 138 and the electrode assembly 110 are secured by the rib 254.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A rechargeable battery, comprising:
   an electrode assembly comprising a positive electrode, a negative electrode, and a separator interposed therebetween;
   a case to house the electrode assembly;
   a cap assembly coupled to an opening of the case, electrically connected to the electrode assembly; and
   an insulating member having a body that contacts the outer surface of the electrode assembly, and an elastically deformable rib that extends from the body and contacts and is deformed by the case,
   wherein the elastically deformable rib extends further from the central vertical axis of the rechargeable battery in a latitudinal orientation than the body.

2. The rechargeable battery of claim 1, further comprising a current collecting plate electrically connected with the positive electrode or the negative electrode, wherein the insulating member surrounds the periphery of the current collecting plate.

3. The rechargeable battery of claim 2, wherein the insulating member includes a flange that extends from the body and contacts the current collecting plate.

4. The rechargeable battery of claim 1, wherein the rib extends from the body, toward the cap assembly.

5. The rechargeable battery of claim 4, wherein a longitudinal cross-section of the rib and the body is generally Y-shaped.

6. The rechargeable battery of claim 1, wherein the rib extends from an end of the body that is furthest from the cap assembly.

7. The rechargeable battery of claim 6, wherein a longitudinal cross-section of the rib and the body is generally V-shaped.

8. The rechargeable battery of claim 1, wherein the rib is formed from a curved portion of the body.

9. The rechargeable battery of claim 1, wherein a sealed shock absorbing space is formed between the rib and the body.

10. The rechargeable battery of claim 9, wherein the shock absorbing space is filled with a gas.

11. The rechargeable battery of claim 1, wherein insulating member comprises a plurality of the ribs, which are spaced apart from one another, along the outer surface of the body.

12. A rechargeable battery, comprising:
    an electrode assembly;
    a case to house the electrode assembly;
    a cap assembly to seal an opening of the case; and
    an annular insulating member having a body that contacts the outer surface of the electrode assembly, and an elastically deformable rib that extends from the body and contacts and is deformed by the case;
    wherein the elastically deformable rib extends further from the central vertical axis of the rechargeable battery in a latitudinal orientation than the body.

13. The rechargeable battery of claim 12, further comprising a current collecting plate disposed between the electrode assembly and the cap assembly, wherein the insulating member further comprises a flange that extends from the body and contacts the current collecting plate.

14. The rechargeable battery of claim 13, wherein the flange contacts a beading portion of the can.

15. The rechargeable battery of claim 12, wherein a lateral cross-section of the body and the rib is V-shaped or Y-shaped.

16. The rechargeable battery of claim 12, wherein a sealed hollow chamber is formed between the body and the rib.

17. The rechargeable battery of claim 12, further comprising a plurality of the insulating members, disposed at intervals along the outer surface of the electrode assembly.

18. The rechargeable battery of claim 12, wherein the rib is formed from a curved portion of the body.

19. The rechargeable battery of claim 12, wherein the rib extends from the body, toward the cap assembly.

20. The rechargeable battery of claim 12, wherein the insulating member comprises a plurality of the ribs.

* * * * *